United States Patent
Günther (10) Patent No.: US 11,647,367 B2
(45) Date of Patent: May 9, 2023

(54) VEHICLE, APPARATUS, METHOD, AND COMPUTER PROGRAM FOR COMPOSING A MESSAGE AT A HIGHER LAYER OF A COMMUNICATIONS PROTOCOL STACK

(71) Applicant: VOLKSWAGEN AKTIENGESELLSCHAFT, Wolfsburg (DE)

(72) Inventor: Hendrik-Jörn Günther, Peine (DE)

(73) Assignee: Volkswagen Aktiengesellschaft

( * ) Notice: Subject to any disclaimer, the term of this patent is extended or adjusted under 35 U.S.C. 154(b) by 136 days.

(21) Appl. No.: 17/334,874

(22) Filed: May 31, 2021

(65) Prior Publication Data

US 2021/0385631 A1    Dec. 9, 2021

(30) Foreign Application Priority Data

Jun. 4, 2020    (EP) .................................... 20178154

(51) Int. Cl.
*H04W 4/46*    (2018.01)

(52) U.S. Cl.
CPC .................................... *H04W 4/46* (2018.02)

(58) Field of Classification Search
CPC ...................................................... H04W 4/46
See application file for complete search history.

(56) References Cited

U.S. PATENT DOCUMENTS

| | | |
|---|---|---|
| 2008/0123518 A1 | 5/2008 | Putzolu et al. |
| 2016/0056927 A1 | 2/2016 | Liu et al. |
| 2017/0171690 A1 | 6/2017 | Kim et al. |
| 2019/0182840 A1 | 6/2019 | Feng et al. |
| 2019/0261214 A1 | 8/2019 | Kim et al. |

FOREIGN PATENT DOCUMENTS

WO    2016057482 A1    4/2016

OTHER PUBLICATIONS

He et al.; Cross-Layer Resource Allocation for Multihop V2X Communications; Wireless Communications and Mobile Computing; vol. 2019; Article ID 5864657; Feb. 12, 2019.

Popovski et al.; Start Making Sense: Semantic Plane Filtering and Control for Post-5G Connectivity; arXiv preprint ArXiv 1901.06337v1; Jan. 18, 2019.

Raisinghani et al.; Cross-Layer Feedback Architecture for Mobile Device Protocol Stacks; IEEE Communications Magazine; Jan. 2006.

Sepulcre et al.; Context-Aware Heterogeneous V2X Communications for Connected Vehicles; Computer Networks, May 2018; pp. 13-21; vol. 136.

(Continued)

*Primary Examiner* — Brian Whipple
(74) *Attorney, Agent, or Firm* — Barnes & Thornburg, LLP (57) ABSTRACT

A transportation vehicle, an apparatus, a method, and a computer program for composing a message at a higher layer of a communications protocol stack. The communications protocol stack includes the higher layer and one or more lower layers being below the higher layer in the protocol stack. The method for composing a message at a higher layer of a communications protocol stack includes receiving information related to a dropped previous message from a lower layer, evaluating a relevancy of a content of the dropped previous message to obtain relevant content, and composing the message based on the relevant content of the dropped previous message.

24 Claims, 5 Drawing Sheets

(56) References Cited

OTHER PUBLICATIONS

SJÖBERG; Medium Access Control for Vehicular Ad Hoc Networks; Doctor of Philosophy Thesis; 2013; Goteborg, Sweden.
Wang et al.; Cross-Layer Signalling for Next-Generation Wireless Systems; IEEE Conference on Wireless Communications and Networking; 2003; pp. 1084-1089; vol. 2.
ETSI EN 302 637-2; Intelligent Transport Systems (ITS); Vehicular Communications; Basic Set of Applications; Part 2: Specification of Cooperative Awareness Basic Service; Sep. 2014; V1.3.1.
ETSI EN 302 637-3; Intelligent Transport Systems (ITS); Vehicular Communications; Basic Set of Applications; Part 3: Specifications of Decentralized Environmental Notification Basic Service; Sep. 2014; V1.2.1.
ETSI EN 302 665; Intelligent Transport Systems (ITS); Communications Architecture; Sep. 2010; V1.1.1.
ETSI TR 101 612; Intelligent Transport Systems (ITS); Cross Layer DCC Management Entity for operation in the ITS G5A and ITS G5B medium; Report on Cross layer DCC algorithms and performance evaluation; Sep. 2014; V1.1.1.
ETSI TR 103 562; Intelligent Transport Systems (ITS); Vehicular Communications; Basic Set of Applications; Analysis of the Collective Perception Service (CPS); Release 2; Dec. 2019; V2.1 1.
ETSI TS 102 636-3; Intelligent Transport Systems (ITS); Vehicular Communications; GeoNetworking; Part 3: Network architecture; Mar. 2010; V1.1 1.
ETSI TS 102687; Intelligent Transport System (ITS); Decentralized Congestion Control Mechanisms for Intelligent Transport Systems operating in the 5 GHz range; Access layer part; Apr. 2018; V1.2.1.
ETSI TS 103 175; Intelligent Transport Systems (ITS); Cross Layer DCC Management Entity for operation in the ITS G5A and ITS G5B medium; Jun. 2015; V1.1.1.
Search Report for European Patent Application No. 20178154.9; dated Oct. 9, 2020.
Office Action; European Patent Application No. 20178154.9; dated Feb. 8, 2023.

VEHICLE, APPARATUS, METHOD, AND COMPUTER PROGRAM FOR COMPOSING A MESSAGE AT A HIGHER LAYER OF A COMMUNICATIONS PROTOCOL STACK

PRIORITY CLAIM

This patent application claims priority to European Patent Application No. 20178154.9, filed 4 Jun. 2020, the disclosure of which is incorporated herein by reference in its entirety.

SUMMARY

Illustrative embodiments relate to a transportation vehicle, an apparatus, a method, and a computer program for composing a message at a higher layer of a communications protocol stack, more particularly, but not exclusively, to a concept for considering packet or message drops that happen at a lower layer when composing messages at a higher layer of a protocol stack.

BRIEF DESCRIPTION OF THE DRAWINGS

Disclosed embodiments will be described with reference to the accompanying figures, in which.

DETAILED DESCRIPTION

Direct communication between mobile devices, also referred to as device-to-device (D2D), vehicle-to-vehicle (V2V), or car-to-car communication (C2C), has been a feature under development of newer generations of mobile communication systems. By enabling direct communication between transportation vehicles, message exchange can be enabled at low latencies. These messages can be used to share information among road or traffic participants.

Document US 2019/0182840 A1 relates to a transmitting device, which performs a resource sensing procedure to acquire information about radio resources usable for transmitting data at a later point in time. After data becomes available for transmission, the transmitting device performs autonomous radio resource allocation to select radio resources within a transmission window to be used for transmitting the data, based on the information acquired by the resource sensing procedure during a sensing window. The autonomous radio resource allocation comprises selecting radio resources in primary subframes of the transmission window optionally over radio resources in secondary subframes of the transmission window. The secondary subframes correspond to those subframes in the sensing window during which the transmitting device did not perform the resource sensing procedure, and the primary subframes correspond to those subframes in the sensing window during which the transmitting device did perform the resource sensing procedure.

Document US 2019/0261214 A1 discloses operation methods of communication nodes supporting direct communications in network. The operation method comprises obtaining scheduling information configured for the direct communications from a first base station, identifying modulation and coding scheme (MCS) information and radio resource information included in the scheduling information, and transmitting, to user equipment, a first message to which a MCS indicated by the MCS information is applied through radio resources indicated by the radio resource information. Therefore, performance of a communication system can be enhanced.

Document US 2017/0171690 A1 describes a method for terminal-condition-based device-to-device (D2D) communication and an apparatus therefor in a wireless communication system. Specifically, the method for a terminal to carry out terminal-condition-based D2D communication in a wireless communication system supporting D2D communication comprises the operations of: a terminal determining a terminal condition indicating the condition to which itself is subject; determining the D2D signal properties on the basis of the terminal condition; and transmitting the D2D signal on the basis of the D2D signal properties.

Document Katrin Sjöberg, "Medium Access Control for Vehicular Ad Hoc Networks", Thesis for the degree of Doctor of Philosophy, Department of Signals and Systems, Göteborg Sweden 2013, considers cooperative intelligent transport systems (C-ITS), where transportation vehicles cooperate by exchanging messages wirelessly to avoid, for example, hazardous road traffic situations. Many C-ITS applications will utilize the wireless communication technology IEEE 802.11p, which offers the ability of direct communication between transportation vehicles, i.e., ad hoc communication, for up to 1000 meters. In this thesis, medium access control (MAC) protocols for vehicular ad hoc networks (VANET) are scrutinized and evaluated. The MAC protocol decides when a station has the right to access the shared communication channel and schedules transmissions to minimize the interference at receiving stations. A VANET is a challenging network for the MAC protocol because the number of stations is unknown a priori and cannot be bounded. Therefore, the scalability of the MAC method has a major influence on the performance of C-ITS applications.

Document US 2016/056927 A1 refers to an early packet loss detection via negative acknowledgement spoofing (NACK) if a packet is lost between a sender and a receiver. The MAC layer of the sender determines which packet has been lost and signals a spoofed NACK packet (indicating the packet loss) to the higher RTP layer. The RTP layer uses NACK packet from the MAC layer rather than a delayed NACK packet from the receiver. The RTP layer retransmits the lost RTP packet, e.g., when the spoofed NACK packet is received from the MAC layer.

Document WO 2016/057482 A1 proposes methods for adapting communication parameters based on channel congestion levels and traffic priority levels. Parameter adaption is coordinated across layers (e.g., between MAC and PHY layer parameters).

There is a demand for an improved concept for composing messages at a higher layer of a protocol stack of a communication system.

This demand is addressed by the independent claims attached.

Disclosed embodiments are based on the finding that information on message or packet drops at a lower layer of a protocol stack can be beneficially exploited at a higher layer. For example, the higher layer can consider the dropped content when composing a new message and decide or prioritize the respective content. Drawbacks related to unknown packet or message drops may be reduced or even avoided.

Disclosed embodiments provide a method for composing a message at a higher layer of a communications protocol stack. The communications protocol stack comprises the higher layer and one or more lower layers being below the higher layer in the protocol stack. The method comprises receiving information related to a dropped previous message from a lower layer, and evaluating a relevancy of a content of the dropped previous message to obtain relevant content. The method further comprises composing the message based on the relevant content of the dropped previous message. Still relevant content of a previously dropped message can be considered when composing a new message.

The evaluating may comprise determining outdated content and still valid content of the dropped previous message to obtain the relevant content. Outdated content may be discarded, and still relevant content may be reconsidered for a new message.

In some exemplary embodiments the composing may comprise including other content into the message, wherein the other content is not comprised in the dropped previous message. New content may be added to the message.

The composing may further comprise determining priorities for the relevant content and the other content and selecting content for the message based on the priorities. For example, in case of a limited message capacity content priorities may be considered to determine a content of a new message.

Furthermore, the method may comprise receiving information related to a message capacity and the composing may further comprise composing the message based on the information related to the message capacity. Message capacity may be considered for composing new messages, e.g., if there is more content than there is capacity in a message, some content may be discarded or delayed.

For example, the information related to the dropped previous message comprises an identification of the dropped previous message. The higher layer may then be enabled to identify the dropped message and its content using the message identification.

The identification may be represented by a repetitive number range. In disclosed embodiments, a message number may be used for message identification and the number may be re-used, e.g., after a certain time or after a certain number of messages. The number range may then be adapted to the number of messages that need to be identified at a time such that the number for a given point in time is unique.

In some exemplary embodiments the method further comprises inserting an identification from the repetitive number range into the message and submitting the message for transmission to the lower layer. In disclosed embodiments the higher layer may tag messages, e.g., in a header part of the message, such that the message can be referenced.

Moreover, the method may further comprise storing the message in a ring buffer for later evaluation. Using a ring buffer may contribute to wrap around referencing and overwriting outdated messages. For example, a ring buffer size may correspond to the number range.

The method may be configured for vehicular application and the dropped previous message and the message may be collective perception messages of a collective perception service. Disclosed embodiments may enable more efficient handling of dropped messages for a collective perception service.

For example, the protocol stack may be configured for direct communication in a cellular network. Examples are an ETSI ITS G5, automotive Intelligent Transport Systems, or an SAE, Society of Automotive Engineers, J2945/DSRC, Dedicated Short-Range Communications, related communication stack.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Another exemplary embodiment is an apparatus for composing a message at a higher layer of a communications protocol stack. The communications protocol stack comprises the higher layer and one or more lower layers being below the higher layer in the protocol stack. The apparatus comprises one or more interfaces configured communicate in the protocol stack and a control module, which is configured to control the one or more interfaces. The control module is further configured to perform one of the methods described herein. Another exemplary embodiment is a transportation vehicle comprising the apparatus.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
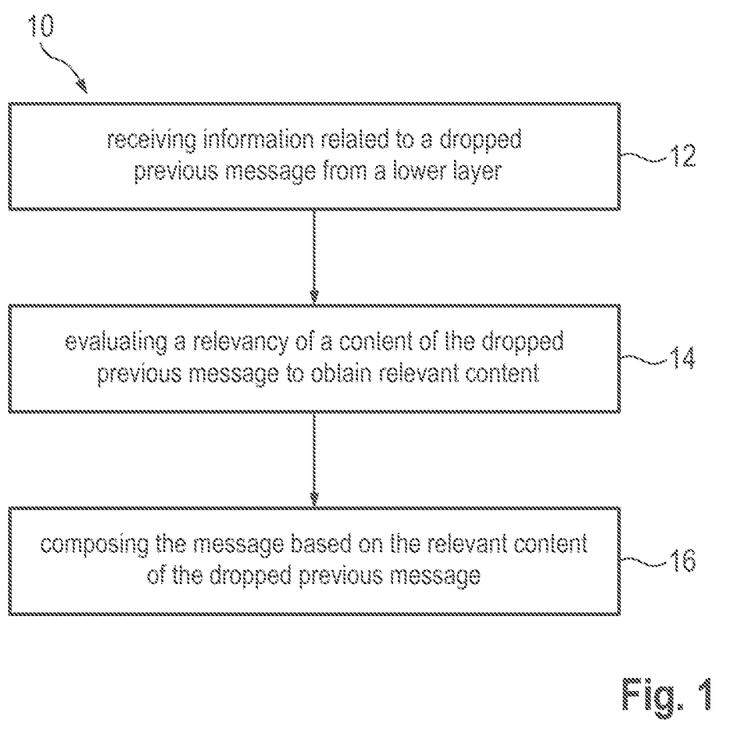
FIG. 1 illustrates a block diagram of an exemplary embodiment of a method for composing a message at a higher layer of a communications protocol stack.

FIG. 1 illustrates a block diagram of an exemplary embodiment of a method 10 for composing a message at a higher layer of a communications protocol stack. The communications protocol stack comprises the higher layer and one or more lower layers being below the higher layer in the protocol stack. The method comprises receiving 12 information related to a dropped previous message from a lower layer, and evaluating 14 a relevancy of a content of the dropped previous message to obtain relevant content. The method further comprises composing 16 the message based on the relevant content of the dropped previous message.

In disclosed embodiments, composing a message means putting together information that makes up the message. Information comprised in the message may be further subdivided into payload, which is information the message is carrying, and control information, which is information for protocol entities (e.g., layers) relating to how to deal with the message. The control information may be comprised in a header or control section of the message and the payload may be comprised in a payload section. Both sections may comprise further sections or fields to further distinguish within the payload and control information. In some exemplary embodiments, payload information is information obtained from and/or provided to an upper layer (a protocol layer above a respective layer).

A protocol stack is a layered structure of different protocols, in which a physical layer is the lowest layer. According to exemplary embodiments, a lower layer informs a higher layer on message drops. For example, a lower layer may be tailored to the physical layer, e.g., in terms of medium access. A common second lowest layer is also referred to as medium access control (MAC) layer. For example, such an access control layer may decide on channel access and if such access is not available, transmissions or messages received for transmission from a higher layer may be discarded (dropped). Multiple reasons are conceivable for such message drops, e.g., the channel is congested, a transmission buffer overflow, the channel is interfered, etc. The higher layer is then informed on the dropped message in exemplary embodiments.

Figure 2:
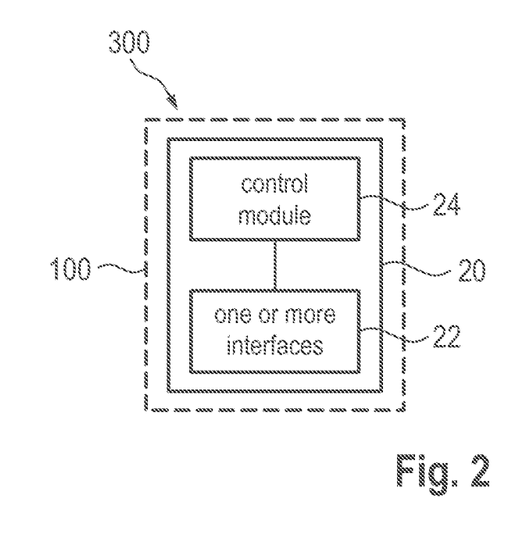
FIG. 2 shows block diagrams of exemplary embodiments of an apparatus for composing a message at a higher layer of a communications protocol stack and an exemplary embodiment of a transportation vehicle.

FIG. 2 shows block diagrams of exemplary embodiments of an apparatus 20 for composing a message at a higher layer of a communications protocol stack and an exemplary embodiment of a transportation vehicle 100. The communications protocol stack comprises the higher layer and one or more lower layers being below the higher layer in the protocol stack. The apparatus comprises one or more interfaces 22 configured communicate in the protocol stack and a control module 24, which is coupled to the one or more interfaces 22, and which is configured to control the one or more interfaces 22. The control module 24 is further configured to perform one of the methods described herein. Another disclosed embodiment is a transportation vehicle 100 comprising an exemplary embodiment of the apparatus 20. The transportation vehicle 100 is shown in broken lines in FIG. 2 as it is optional from the perspective of the apparatus 20.

In disclosed embodiments, the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. In some exemplary embodiments the one or more interfaces 22 may be software interfaces between different protocols or layers of the protocol stack. A protocol may be implemented as software with communication interfaces to other protocols above and/or below in the protocol stack. In some exemplary embodiments the respective protocol layers may be implemented in different locations or entities. Protocol tunneling may be used between different entities.

An interface 22 may be wireless or wireline and it may be configured to communicate, i.e., transmit or receive signals, information with further internal or external components. The one or more interfaces 22 may comprise further components to enable according communication, e.g., in a mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas. In some examples the one or more interfaces 22 may serve the purpose of transmitting or receiving or both, transmitting and receiving, information, such as service packet data units and packet data units.

As shown in FIG. 2 the one or more interfaces 22 are coupled to the respective control module 24 at the apparatus 20. In disclosed embodiments the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc.

In exemplary embodiments, communication, i.e., transmission, reception or both, may take place among transportation vehicles directly and/or between mobile transceivers/vehicles and a network component/entity (infrastructure or mobile transceiver, e.g., a base station, a network server, a backend server, etc.). Such communication may make use of a mobile communication system. Such communication may be carried out directly, e.g., by device-to-device (D2D) communication, which may also comprise vehicle-to-vehicle (V2V) or car-to-car (C2C) communication in case of transportation vehicles, and which may be carried out using the specifications of a mobile communication system.

In disclosed embodiments the one or more interfaces 22 can be configured to wirelessly communicate in the protocol stack of a mobile communication system. For example, direct cellular vehicle-to-anything (C-V2X), where V2X includes at least V2V, V2-Infrastructure (V2I), V2-Pedestrian (V2P), etc., transmission according to 3GPP Release 14 onward can be managed by infrastructure (so-called mode 3 in LTE) or run in a UE (so-called mode 4 in LTE).

User equipment (UE)/vehicles may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, dedicated short range communication (DSRC), respectively. Technologies enabling such D2D-communication include 802.11p and beyond, 3GPP (Third Generation Partnership Project) system (4G (4th Generation), 5G (5th Generation), NR (New Radio) and beyond), etc. For example, transportation vehicles exchange certain messages, for example, Cooperative Awareness Messages (CAM) or Decentralized Environment Notification Messages (DENM), etc. The content of such messages may enable recipients to become aware of their environment and determine the first environmental map.

Figure 3:
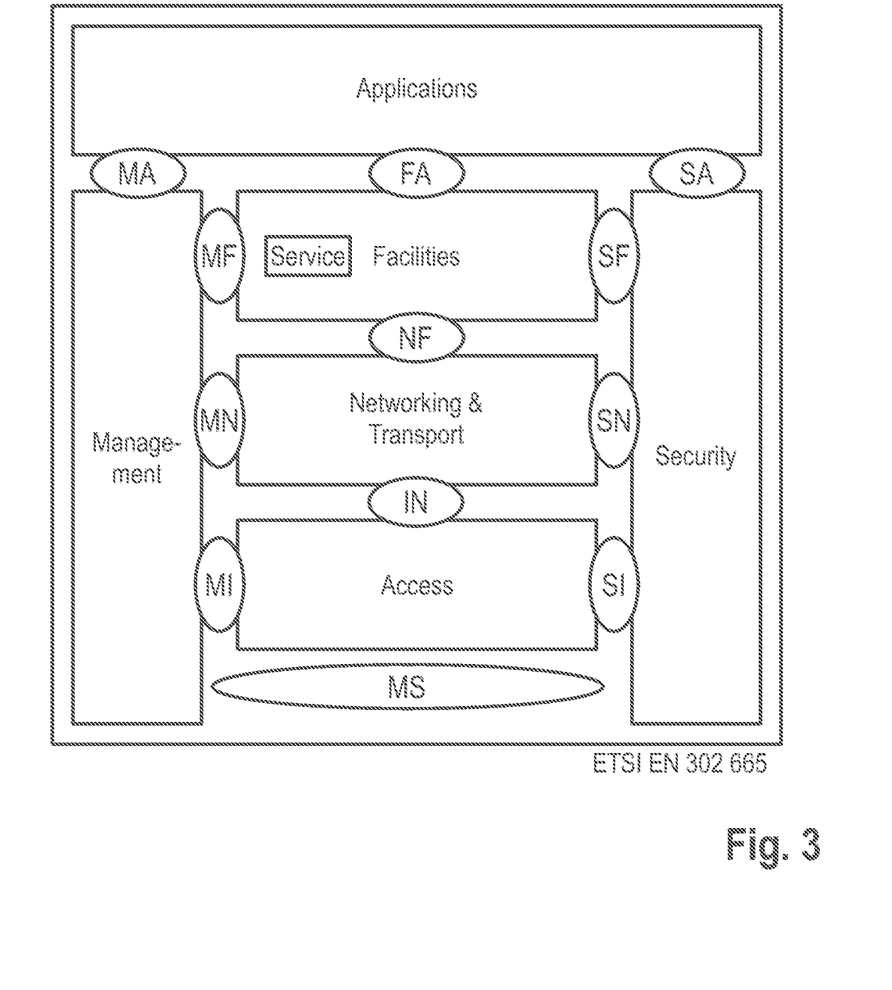
FIG. 3 depicts a protocol stack of an exemplary embodiment.

Disclosed embodiments may address the architecture and features of a communications stack for Intelligent Transportation System (ITS), for example, ETSI (European Telecommunications Standards Institute) ITS G5 and SAE (Society of Automotive Engineers) J2945/DSRC-related communication stacks. Within the realm of an ITS-stack, "Services" are referred to as high-layer software components or entities, responsible for either generating and encoding or receiving and decoding ITS-related messages. Services are located within the Facility-layer of an ETSI ITS G5-Stack. Such a protocol stack is depicted in FIG. 3. Further details can also be found in ETSI EN 302 665 V1.1.1. As shown in FIG. 3 the highest layer is the Applications layer, on top of the Facilities layer, which provides a service. Underneath there are Networking & Transport layers and an Access layer. The protocol layers are guided by a Management layer (shown on the left) and a Security layer (shown on the right). The according interfaces are denoted using the first letters of the respective layers, which are interfaced, e.g., MS-interface between Management and Security, MA-interface between Management and Application, etc., where interfaces to the access layer use "I" as abbreviation.

Services generate messages in accordance with generation rules, as specified by, e.g., ETSI EN 302 637-2 (CAM) or ETSI EN 302 637-3 (DENM). Once a message has been generated and passed on via the NF-interface (or similar interfaces in other stacks) to the Networking & Transport-Layer, messages are enqueued into priority queues before being selected for transmission. These queues are served in relation to the current channel load. Depending on the number of generated messages within a time window, already enqueued messages may be replaced by new incoming messages without being transmitted (i.e., they are dropped).

For some services, particularly the "Collective Perception Service" (ETSI TR 103 562/ETSI TS 103 324), optimal service behavior cannot be achieved, when not being informed about a message drop. Disclosed embodiments introduce the concept of lower-layer stack feedback to ITS Services. Information about (particular) message drops can be used by the service to include otherwise omitted information in the next message to be generated.

Further details on feedback loops in communications stack design can be found, for example, in Raisinghani, Vijay T., and Sridhar Iyer. "Cross-layer feedback architecture for mobile device protocol stacks." IEEE Communications Magazine 44.1 (2006): 85-92, Wang, Qi, and Mosa Ali Abu-Rgheff. "Cross-layer signalling for next-generation wireless systems." 2003 IEEE Wireless Communications and Networking, 2003. WCNC 2003 . . . Vol. 2. IEEE, 2003, He, Yanhua, et al. "Cross-layer resource allocation for multihop V2X communications." Wireless Communications and Mobile Computing 2019 (2019), and Sepulcre, Miguel, and Javier Gozalvez. "Context-aware heterogeneous V2X communications for connected vehicles." Computer Networks 136 (2018): 13-21.

Disclosed embodiments integrate lower-layer stack feedback into service design, e.g., within the domain of Collective Perception on which further details can be found in ETSI TS 102 636-3 Intelligent Transport Systems (ITS); Vehicular Communications; GeoNetworking; Part 3: Network architecture; Geonetworking, ETSI TS 102 687 Intelligent Transport Systems (ITS); Decentralized Congestion Control Mechanisms for Intelligent Transport Systems operating in the 5 GHz range; Access layer part, ETSI TS 103 175 Intelligent Transport Systems (ITS); Cross Layer DCC Management Entity for operation in the ITS G5A and ITS G5B medium, ETSI EN 302 637-2 Intelligent Transport Systems (ITS); Vehicular Communications; Basic Set of Applications; Part 2: Specification of Cooperative Awareness Basic Service, ETSI TR 103 562 Intelligent Transport Systems (ITS); Vehicular Communications; Basic Set of Applications; Analysis of the Collective Perception Service (CPS); Release 2, and ETSI TS 103 324 Intelligent Transport Systems (ITS); Cooperative Perception Services.

Figure 4:
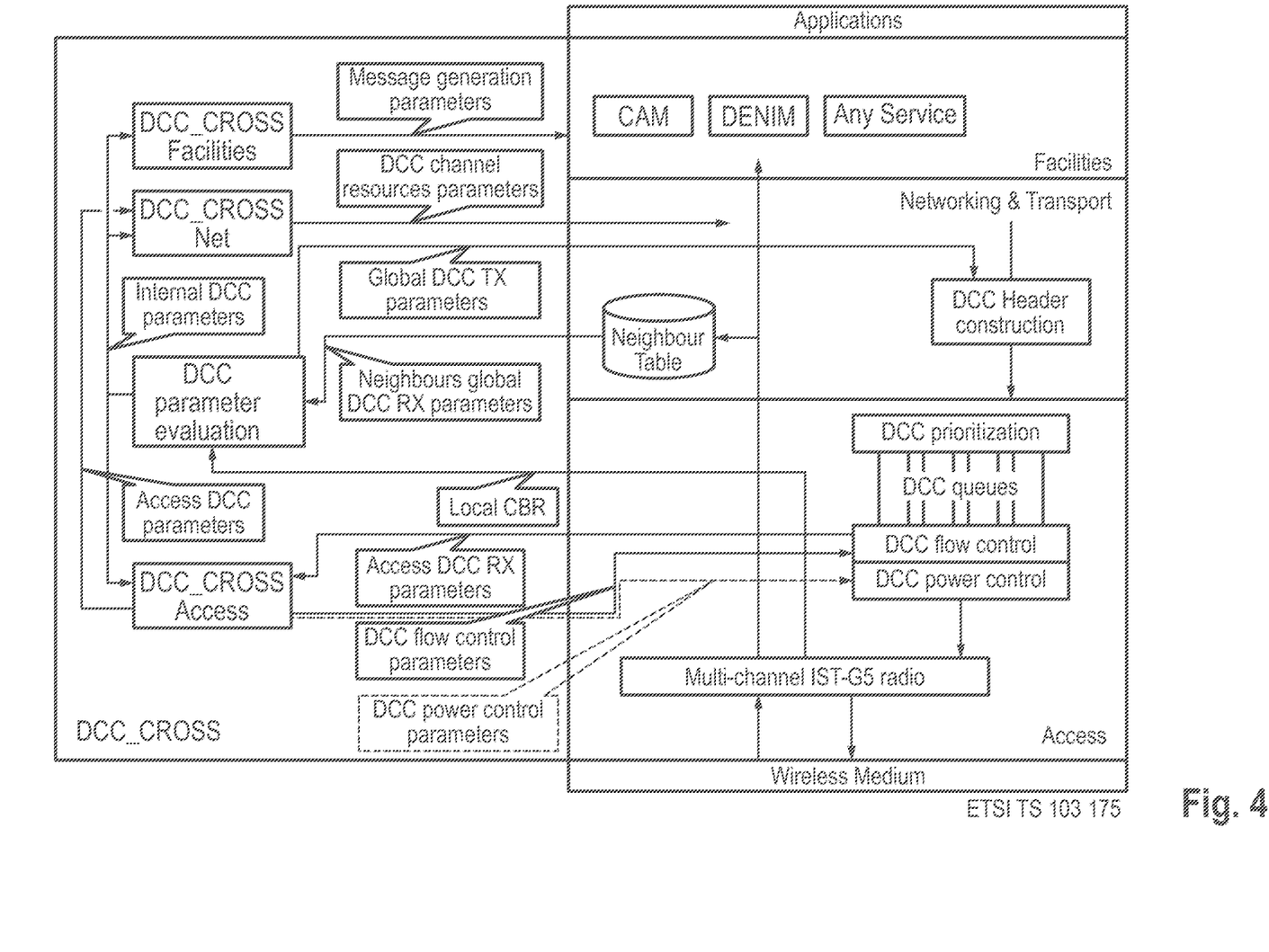
FIG. 4 illustrates a further protocol stack of an exemplary embodiment.

FIG. 4 illustrates a further protocol stack in an exemplary embodiment, on which further details can be found in ETSI TS 103 175. FIG. 4 shows the protocol stack as introduced in FIG. 3 on the right and provides more details on the implementation of decentralized congestion control, for which details are depicted on the left of FIG. 4.

The aim of the Decentralized Congestion Control (DCC) is to adapt the transmit parameters of the ITS station (ITS-S) given present radio channel conditions, to maximize the probability of a successful reception at intended receivers. The DCC attempts to provide equal access to the channel resources among neighboring ITS-S. The channel resources allotted by the DCC to the ITS-S should be distributed between the applications according to their needs. The ITS-S determines priorities between different messages and discards messages if application requirements exceed allotted resources (with the ITS-S applications' consent). In case of a situation of road traffic emergency even during a high network utilization period, where every ITS-S has very few resources (e.g., CAM period at 1 Hz or 2 Hz), the ITS-S may still transmit a burst of messages during a short period of time to maintain a safe road traffic environment. However, this exception shall occur rarely and the messages transmitted for this purpose are only those of uttermost importance. Cross-layer operation of the DCC mechanisms is used for ITS-S operating in the ITS-G5 band. DCC management functions in the DCC_CROSS entity and the corresponding internal functions related to the different layers in the management entity are defined in ETSI TR 101 612. Functional behavior and the interfaces of the DCC_CROSS component to control the load on the active radio channels is described. Channel load limits are provided to accommodate this.

The DCC_CROSS entity is illustrated on the left side of FIG. 4, it is configured for multi-channel operation and global DCC information, as described in ETSI TR 101 612. The right part illustrates the functions in the data layers interacting with the DCC_CROSS. The management plane of an ITS-S that transmits on an ITS-G5 radio channel includes a DCC_CROSS entity. It contains the management of specific DCC functionalities:

DCC parameter evaluation, which computes the DCC internal parameters which indicate the available channel resources based on CBR (channel busy ratio) values collected by the CBR evaluation function (local CBR) and received by the DCC_NET (highest global CBR value), DCC_CROSS_Access, which determines the DCC flow control and the DCC power control parameters for each used radio channel based on the internal DCC parameters computed by the DCC parameter evaluation function and provide them to the DCC_ACC entity, DCC_CROSS_Net, which returns to the DCC_NET the available resources per radio channel used, DCC_CROSS_Facilities, which uses internal DCC parameters from the DCC parameter evaluation function to determine the available channel resource limit for the registered applications and basic facilities services. This value is provided to the DCC_FAC entity.

Specification of Network & Transport layer can be found in

ETSI TS 102 636-3 Intelligent Transport Systems (ITS); Vehicular Communications; GeoNetworking; Part 3: Network architecture; Geonetworking, Details on Decentralized Congestion Control Mechanisms can be found in ETSI TS 102 687 Intelligent Transport Systems (ITS); Decentralized Congestion Control Mechanisms for Intelligent Transport Systems operating in the 5 GHz range; Access layer part, ETSI TS 103 175 Intelligent Transport Systems (ITS); Cross Layer DCC Management Entity for operation in the ITS G5A and ITS G5B medium.

Both currently provide only limited feedback to ITS Services located in the Facilities layer of the ITS stack ITS services, such as the CA Basic Service, which is detailed in ETSI EN 302 637-2 Intelligent Transport Systems (ITS); Vehicular Communications; Basic Set of Applications; Part 2: Specification of Cooperative Awareness Basic Service, and which may employ only limited lower layer metrics, such as T_GenCam_Dcc, to account for lower-layer behavior in the message generation rules. T_GenCam_DCC provides an estimate about the next point in time for when the next CA Message may be transmitted. It is a lower-layer feedback mechanism, provided by the DCC Cross-Layer entity, to signal available radio resources to the upper layer entities.

For the CA Service, this signaling mechanism may be sufficient, as only information about the current state of the transmitting transportation vehicle are included. In case messages are dropped, receivers will still only receive the latest generated message. Receivers are not interested in potentially dropped messages, as only the most recent state information is relevant.

In the context of the Collective Perception Service, details on which can be found in ETSI TR 103 562 Intelligent Transport Systems (ITS); Vehicular Communications; Basic Set of Applications; Analysis of the Collective Perception Service (CPS); Release 2, and ETSI TS 103 324 Intelligent Transport Systems (ITS); Cooperative Perception Services, The existing signaling mechanism is insufficient, as message generation is not based on the transmitter's state, but on its locally perceived objects.

Figure 5:
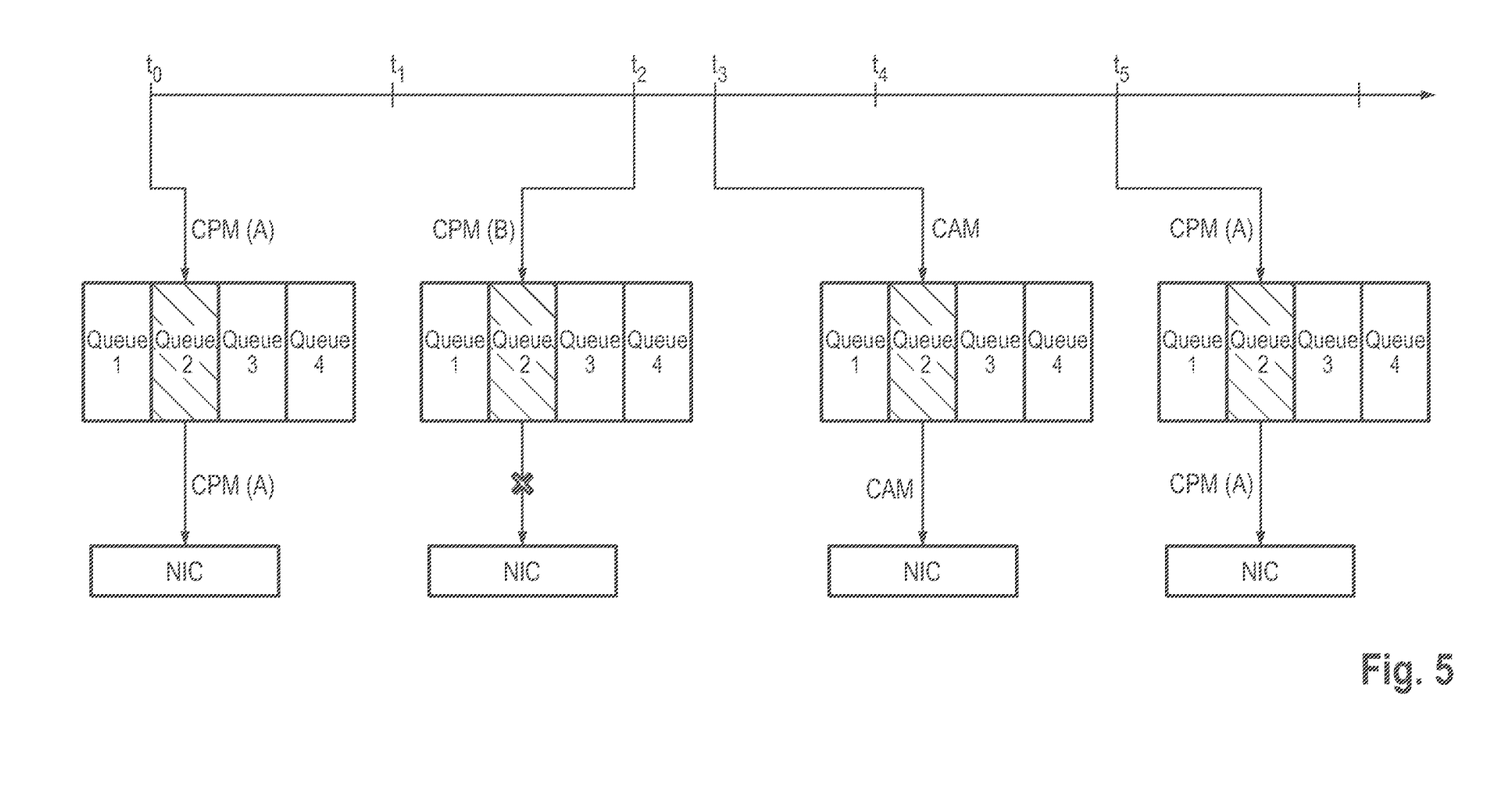
FIG. 5 depicts a timeline of a message drop in an exemplary embodiment.

As the prospective generation rules for the CP Service are based on the dynamics of the perceived objects (to reduce message size), each generated CPM may include information about a different set of objects. FIG. 5 depicts a timeline of a message drop in an exemplary embodiment, which is considered in the following. Time t0 displays a regular CPM transmission. A CPM (A), containing the object set A, is successfully selected for transmission and passed on to the network interface card (NIC). As shown in FIG. 5 there are 4 queues for buffering messages in this disclosed embodiment. At time t2, the next CPM (B), containing a different set of objects B is generated but not transmitted due to channel load restrictions. At time t3, a CAM is generated and enqueued, thereby replacing the CPM (B) in the transmission queues. The CP Service is not informed about this drop. At time t5, the next CPM (A), containing yet again information about the set of objects A, is enqueued and subsequently selected for transmission.

For receiving ITS-Ss, information about the detected object set B are never received. The CP Service on the transmitting station is unaware of this message not being transmitted. In the following exemplary embodiment, the method 10 is configured for vehicular application and the dropped previous message and the message are collective perception messages of a collective perception service. The protocol stack is for direct communication in a cellular network, e.g., an ETSI ITS G5, automotive Intelligent Transport Systems, or an SAE, Society of Automotive Engineers, J2945/DSRC, Dedicated Short-Range Communications,—related communication stack.

In exemplary embodiments, upon dropping a message, lower layer stack entities inform higher layer entities about the specific message drop. In the context of the Collective Perception Service, the service is informed about the drop of a specific message. For example, the message can be identified by generation of a timestamp and (optionally) by segmentation information (e.g., "message 2/3 has been dropped"). The information related to the dropped previous message may comprise an identification of the dropped previous message, e.g., the identification is represented by a number from a repetitive number range. The identification may be inserted from the repetitive number range into the message and the message is submitted for transmission to the lower layer. The method 10 may further comprise storing the message in a ring buffer for later evaluation. The ring buffer size may correspond to the number range. By reporting the message identification the message can be identified in the ring buffer and its content can be evaluated for further processing. For example, if there is a maximum of 8 messages conceivable to be in transit (submitted to lower layer for transmission) three bits would suffice to identify a message. The message identification would then be simply wrapped (number reuse after eighth message).

The CP service can employ this information to re-include information about previously dropped messages (and therefore not transmitted objects) when generating the subsequent CP Message. For example, the evaluating 14 of the method 10 may comprise determining outdated content and still valid content of the dropped previous message to obtain the relevant content. Outdated content can be discarded, and still valid content can be included in a subsequent message. The composing 16 may comprise including other content into the message, wherein the other content is not comprised in the dropped previous message. Hence, the subsequent or new message potentially comprises still valid content of the dropped message and new content. The composing 16 may comprise determining priorities for the relevant content and the other content and selecting content for the message based on the priorities.

Figure 6:
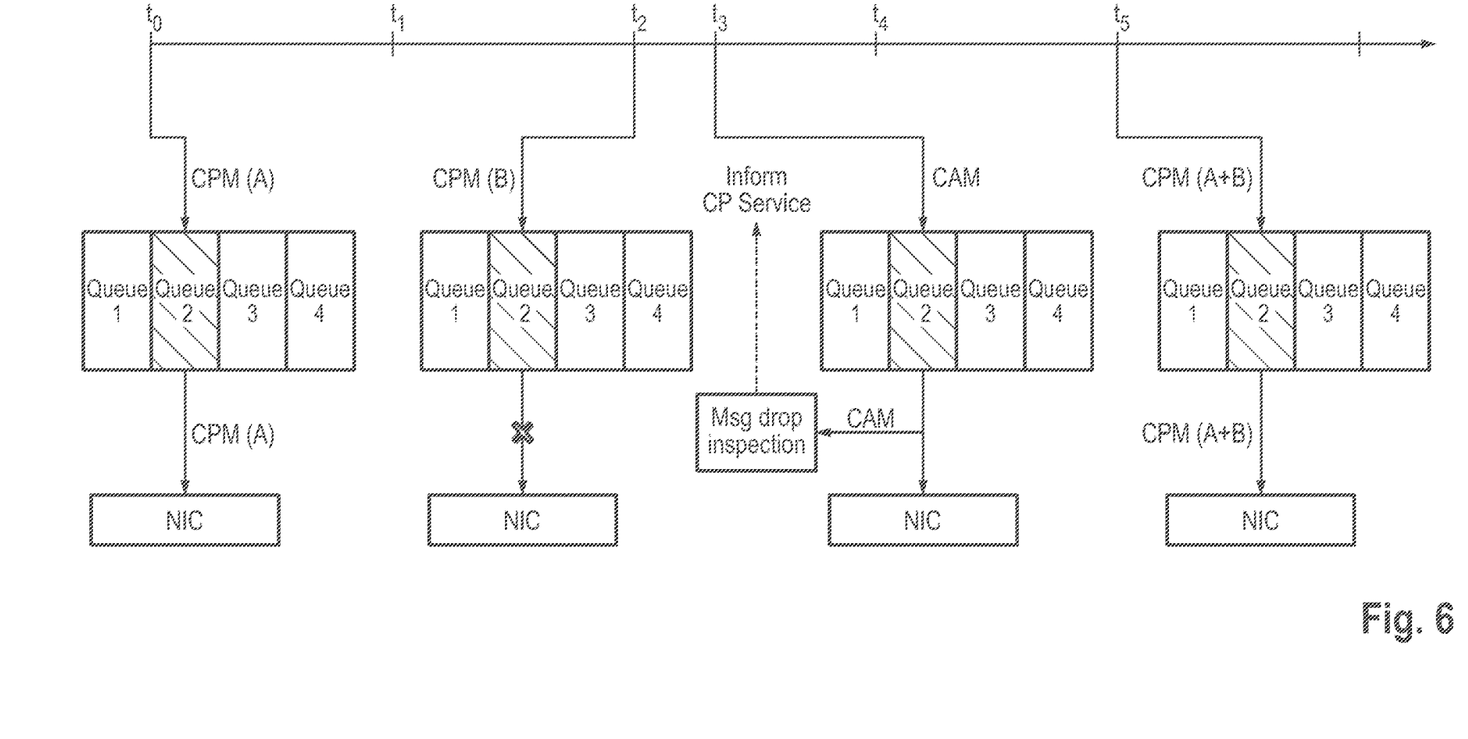
FIG. 6 depicts another timeline of a message drop in an exemplary embodiment.

Considering the temporal behavior of FIG. 5, the disclosed embodiment behaves according to FIG. 6. FIG. 6 depicts another timeline of a message drop in an exemplary embodiment using a similar representation as FIG. 5. When enqueueing CAM at t3, the message drop of CPM (B) is detected and the dropped message is inspected. The CP Service is informed about the particular message being dropped. When generating the next CPM at t5, the CP Service re-includes (potentially now updated) information about the object set B that was dropped previously.

For example, the method 10 may comprise receiving information related to a message capacity. For example, radio conditions may dictate a transmission capacity, e.g., through selection of a certain modulation and coding scheme. The message capacity may then be given in terms of an amount of information, e.g., a number of bits. The composing 16 then further comprises composing the message based on the information related to the message capacity. Content information to be included or excluded from the message may then be selected based on content priorities.

As already mentioned, in disclosed embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for composing a message at a higher layer of a communications protocol stack
12 receiving information related to a dropped previous message from a lower layer
14 evaluating a relevancy of a content of the dropped previous message to obtain relevant content
16 composing the message based on the relevant content of the dropped previous message
20 apparatus for a transportation vehicle and for determining a merged environmental map of the transportation vehicle
22 one or more interfaces
24 control module
100 transportation vehicle

The invention claimed is:

1. An apparatus for composing a message at a higher layer of a communications protocol stack for communication in a communication network, the communications protocol stack comprising the higher layer and one or more lower layers being below the higher layer in the protocol stack, the apparatus comprising:
one or more communication interfaces configured to communicate in the protocol stack; and
a control module implemented in software running on a computer processor and configured to control the one or more communication interfaces for communication over the communication network, wherein the control module is further configured to control:
receiving information related to a dropped previous communication network message from a lower layer,
evaluating a relevancy of content of the dropped previous communication network message to obtain relevant content, wherein the evaluating comprises determining outdated content and still valid content of the dropped previous communication network message to obtain the relevant content, and composing a new communication network message based on the relevant content of the dropped previous communication network message.

2. The apparatus of claim 1, wherein the composing comprises including other content into the new communication network message, wherein the other content is not comprised in the dropped previous communication network message.

3. The apparatus of claim 2, wherein the composing comprises determining priorities for the relevant content and the other content and selecting content for the new communication network message based on the priorities.

4. The apparatus of claim 2, wherein the control module is further configured to control receiving information related to a message capacity and wherein the composing further comprises composing the new communication network message based on the information related to the message capacity.

5. The apparatus of claim 2, wherein the information related to the dropped previous communication network message comprises an identification of the dropped previous communication network message.

6. The apparatus of claim 5, wherein the identification is represented by a repetitive number range.

7. The apparatus of claim 6, wherein the control module is further configured to control inserting an identification from the repetitive number range into the new communication network message and submitting the new communication network message for transmission to the lower layer.

8. The apparatus of claim 7, wherein the control module is further configured to control storing the new communication network message in a ring buffer for later evaluation.

9. The apparatus of claim 8, wherein a ring buffer size corresponds to the number range.

10. The apparatus of claim 1, being configured for vehicular application, wherein the dropped previous communication network message and the new communication network message are collective perception messages of a collective perception service.

11. The apparatus of claim 1, wherein the protocol stack is for direct communication, wherein the communication network is a cellular network.

12. A transportation vehicle comprising an apparatus for composing a message at a higher layer of a communications protocol stack for communication in a communication network, the communications protocol stack comprising the higher layer and one or more lower layers being below the higher layer in the protocol stack, the apparatus including:

one or more communication interfaces configured to communicate in the protocol stack; and a control module implemented in software running on a computer processor and configured to control the one or more communication interfaces for communication over the communication network, wherein the control module is further configured to control:

receiving information related to a dropped previous communication network message from a lower layer, evaluating a relevancy of content of the dropped previous communication network message to obtain relevant content, wherein the evaluating comprises determining outdated content and still valid content of the dropped previous communication network message to obtain the relevant content, and composing a new communication network message based on the relevant content of the dropped previous communication network message.

13. A method for composing a message at a higher layer of a communications protocol stack for communication in a communication network, the communications protocol stack comprising the higher layer and one or more lower layers being below the higher layer in the protocol stack, the method comprising:

receiving information related to a dropped previous communication network message from a lower layer via a communication interface;

evaluating, under control of a control module implemented in software running on a computer processor, a relevancy of a content of the dropped previous communication network message to obtain relevant content, wherein the evaluating comprises determining outdated content and still valid content of the dropped previous communication network message to obtain the relevant content; and composing the new communication network message based on the relevant content of the dropped previous communication network message.

14. The method of claim 13, wherein the composing comprises including other content into the new communication network message, wherein the other content is not comprised in the dropped previous communication network message.

15. The method of claim 14, wherein the composing comprises determining priorities for the relevant content and the other content and selecting content for the new communication network message based on the priorities.

16. The method of claim 14, further comprising receiving information related to a message capacity and wherein the composing further comprises composing the new communication network message based on the information related to the message capacity.

17. The method of claim 13, wherein the information related to the dropped previous communication network message comprises an identification of the dropped previous communication network message.

18. The method of claim 17, wherein the identification is represented by a repetitive number range.

19. The method of claim 18, further comprising inserting an identification from the repetitive number range into the new communication network message and submitting the new communication network message for transmission to the lower layer.

20. The method of claim 19, further comprising storing the new communication network message in a ring buffer for later evaluation.

21. The method of claim 20, wherein a ring buffer size corresponds to the number range.

22. The method of claim 13, being configured for vehicular application and wherein the dropped previous communication network message and the new communication network message are collective perception messages of a collective perception service.

23. The method of claim 13, wherein the protocol stack is for direct communication, wherein the communication network is a cellular network.

24. A non-transitory computer readable medium including a computer program having a program code for composing a communication network message at a higher layer of a communications protocol stack, the communications protocol stack comprising the higher layer and one or more lower layers being below the higher layer in the protocol stack, when the computer program is executed on a computer, a processor, or a programmable hardware component, the method comprising:
- receiving information related to a dropped previous communication network message from a lower layer;
- evaluating a relevancy of a content of the dropped previous communication network message to obtain relevant content, wherein the evaluating comprises determining outdated content and still valid content of the dropped previous communication network message to obtain the relevant content; and
- composing a new communication network message based on the relevant content of the dropped previous communication network message.

* * * * *